US006752853B2

(12) United States Patent
Simpson et al.

(10) Patent No.: US 6,752,853 B2
(45) Date of Patent: Jun. 22, 2004

(54) ARTICLE AND METHOD FOR ELIMINATION OF HYDROCARBON EMISSIONS FROM PRINTER EXHAUST

(75) Inventors: Charles W. Simpson, Lakeland, MN (US); James A. Baker, Hudson, WI (US); A. Kristine Fordahl, Hopkins, MN (US); Susan E. Hill, Woodbury, MN (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/286,406

(22) Filed: Oct. 31, 2002

(65) Prior Publication Data

US 2004/0083887 A1 May 6, 2004

(51) Int. Cl.[7] .......... B01D 53/04

(52) U.S. Cl. .......... 95/143; 96/132; 96/135; 96/142; 96/153; 55/515; 55/519

(58) Field of Search .......... 95/143, 144, 147; 96/108, 131, 132, 134, 135, 138, 142, 147, 153, 154; 55/513, 515, 516, 518, 519

(56) References Cited

U.S. PATENT DOCUMENTS

| | | | | | |
|---|---|---|---|---|---|
| 3,629,998 | A | * | 12/1971 | Takehisa | 95/141 |
| 4,102,783 | A | * | 7/1978 | Zenno et al. | 210/691 |
| 4,175,932 | A | | 11/1979 | Durr et al. | 55/59 |
| 4,234,326 | A | * | 11/1980 | Bailey et al. | 96/154 |
| 4,397,663 | A | | 8/1983 | Michlin et al. | 55/387 |
| 4,462,811 | A | | 7/1984 | Dinsmore et al. | 55/18 |
| 4,519,816 | A | * | 5/1985 | Clarke | 95/141 |
| 4,684,382 | A | * | 8/1987 | Abu-Isa | 96/134 |
| 4,687,319 | A | | 8/1987 | Mishra | 355/10 |
| 4,731,635 | A | | 3/1988 | Szluchra et al. | 355/10 |
| 4,745,432 | A | | 5/1988 | Langdon | 355/3 |
| 4,766,462 | A | | 8/1988 | Dyer et al. | 355/10 |
| 5,288,307 | A | * | 2/1994 | Goltz et al. | 95/143 |
| 5,539,071 | A | * | 7/1996 | Steffler | 526/208 |
| 5,595,586 | A | * | 1/1997 | Sivavec | 95/143 |
| 5,628,819 | A | | 5/1997 | Mestemaker et al. | 96/122 |
| 5,641,847 | A | * | 6/1997 | Hozumi et al. | 526/328.5 |
| 5,676,738 | A | * | 10/1997 | Cioffi et al. | 95/109 |
| 5,700,310 | A | * | 12/1997 | Bowman et al. | 95/45 |
| 5,737,674 | A | | 4/1998 | Venkatesan et al. | 399/250 |
| 5,767,060 | A | * | 6/1998 | Hanrahan | 210/502.1 |
| 5,830,967 | A | * | 11/1998 | Sojka | 526/323.2 |
| 5,905,928 | A | | 5/1999 | Shin | 399/250 |
| 5,906,572 | A | * | 5/1999 | Holland | 588/255 |
| 5,940,666 | A | | 8/1999 | Han | 399/249 |
| 5,951,741 | A | | 9/1999 | Dahl et al. | 95/11 |
| 6,015,494 | A | * | 1/2000 | Siverling et al. | 210/299 |
| 6,056,805 | A | * | 5/2000 | Litwin et al. | 95/143 |
| 6,064,851 | A | | 5/2000 | Saitoh | 399/348 |
| 6,107,429 | A | * | 8/2000 | Sojka | 526/323.2 |
| 6,141,518 | A | | 10/2000 | Shin et al. | 399/250 |
| 6,146,449 | A | * | 11/2000 | Lee et al. | 96/117.5 |
| 6,231,758 | B1 | * | 5/2001 | Morris et al. | 210/163 |
| 6,290,344 | B1 | | 9/2001 | Saikawa et al. | 347/86 |
| 6,308,626 | B1 | | 10/2001 | Crystal et al. | 101/424.1 |
| 6,314,260 | B1 | | 11/2001 | Watanabe | 399/250 |
| 6,464,761 | B1 | * | 10/2002 | Bugli | 96/135 |
| 2002/0031367 | A1 | | 3/2002 | Yamamoto et al. | 399/93 |
| 2002/0031373 | A1 | | 3/2002 | Yoshikawa | 399/249 |
| 2002/0037181 | A1 | | 3/2002 | Takahara | 399/250 |

* cited by examiner

*Primary Examiner*—Robert H. Spitzer
(74) *Attorney, Agent, or Firm*—Mark A. Litman & Associates, P.A.

(57) ABSTRACT

A method and apparatus of the invention includes a method of removing airborne hydrocarbons from liquid electrophotographic printer exhaust comprises generating airborne hydrocarbon droplets as either vapor or mist during the transportation of electrophotographic ink or toner, directing substantially all of the air and hydrocarbon droplet mixture to a central collection point, forcing the air/droplet mixture to and through an oleophilic, substantially non-leaching collection media, and exhausting substantially hydrocarbon-free air from the electrophotographic printer. The method may further comprise inducing pressure in the printer with air pressure reduction to pull the exhaust through the collection media, for example with a pump or fan used to produce air pressure reduction. The method may comprise inducing airflow in the printer with ventilation holes or by the addition of a fan to provide a fresh air inlet. The air/hydrocarbon mixture may be directed to the collection media by a transportation system.

20 Claims, 7 Drawing Sheets

Figure 1—circular frames with screens on one side, screwed together with absorbent media in the middle [any shape will work]
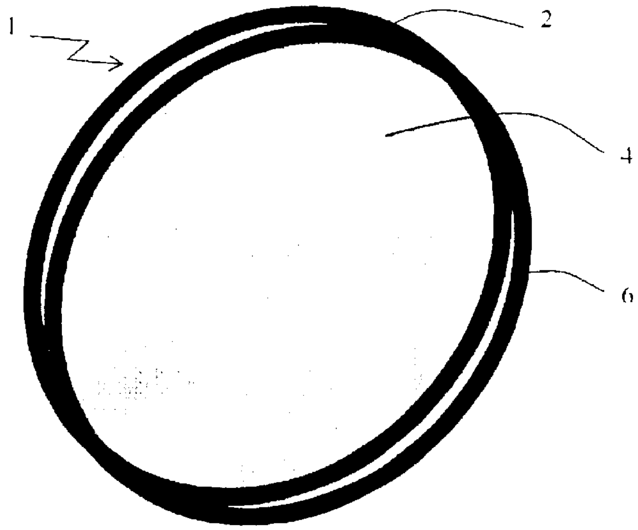
Figure 2—current construction side view
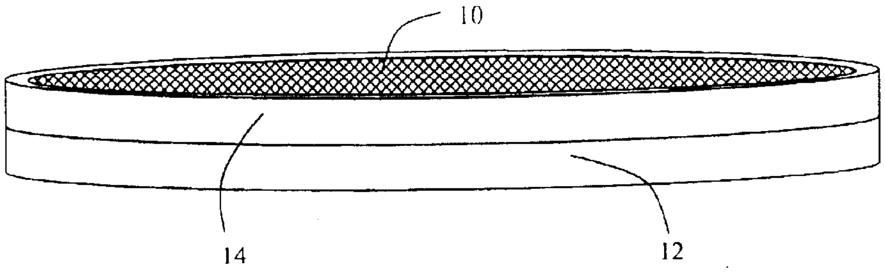

Figure 3—one option (embodiment) is to surround the absorbent media with an oleophilic cloth or non-woven material (e.g. polypropylene)
Exploded view:
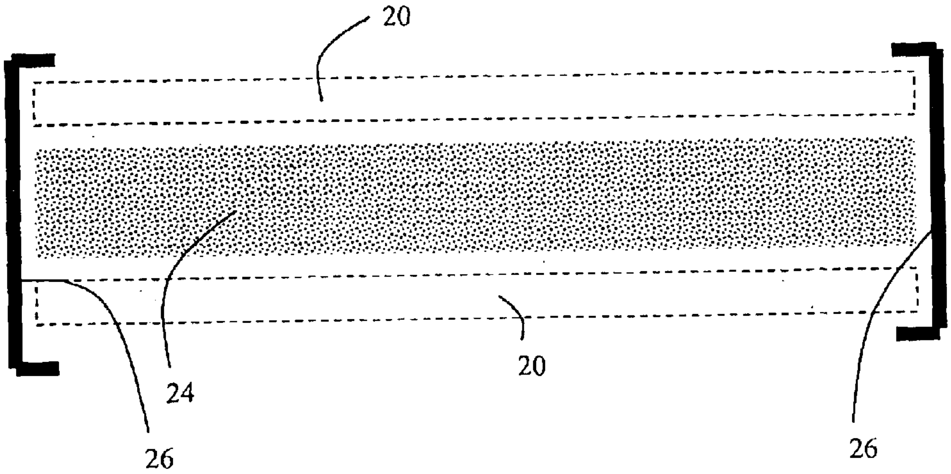

Figure 4—cutaway view (either mesh or polypropelene surfaces)

One embodiment foresees that if there is a sufficient quantity of absorbent to meet the printer needs, there might be too much density to allow any air to pass through. One solution is to create air channels extending either fully or completely through the media bed. Since the poly is also oleophilic, it could be used to trap any remaining hydrocarbon that was not fully captured by the media.

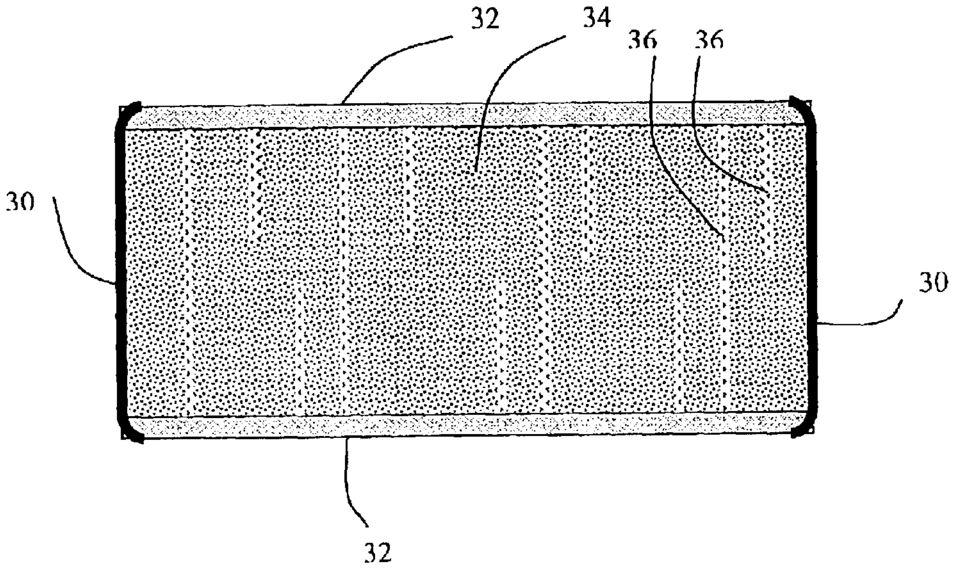

Figure 5—possible shape/design embodiment—some manufactures may chose to use a pump to ascertain that all of the contaminated exhausted gets into the filter
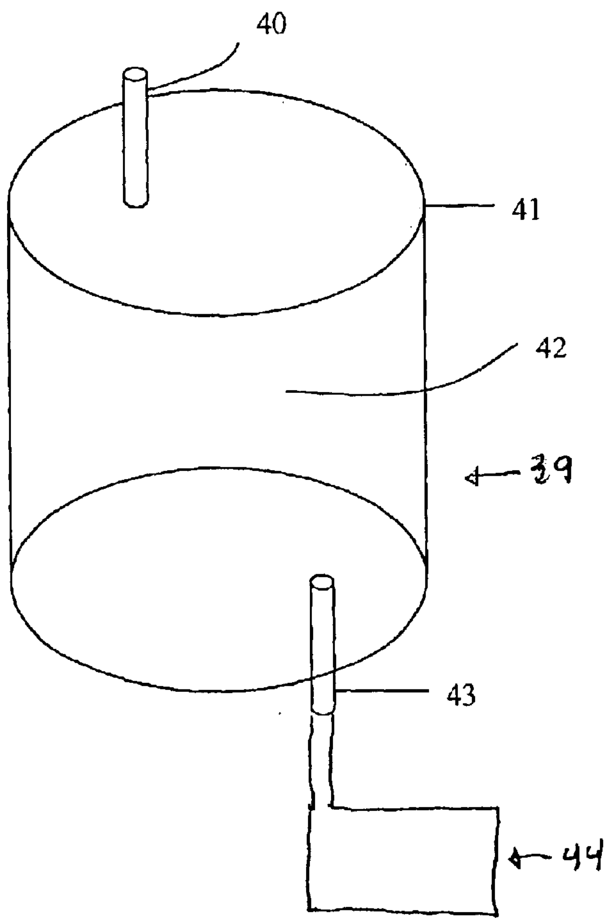

Figure 6—when using a pump (or stronger fan) it is preferrable to use several types and densities of absorbent media and layer them so that the largest airborne droplets are removed from the air first.
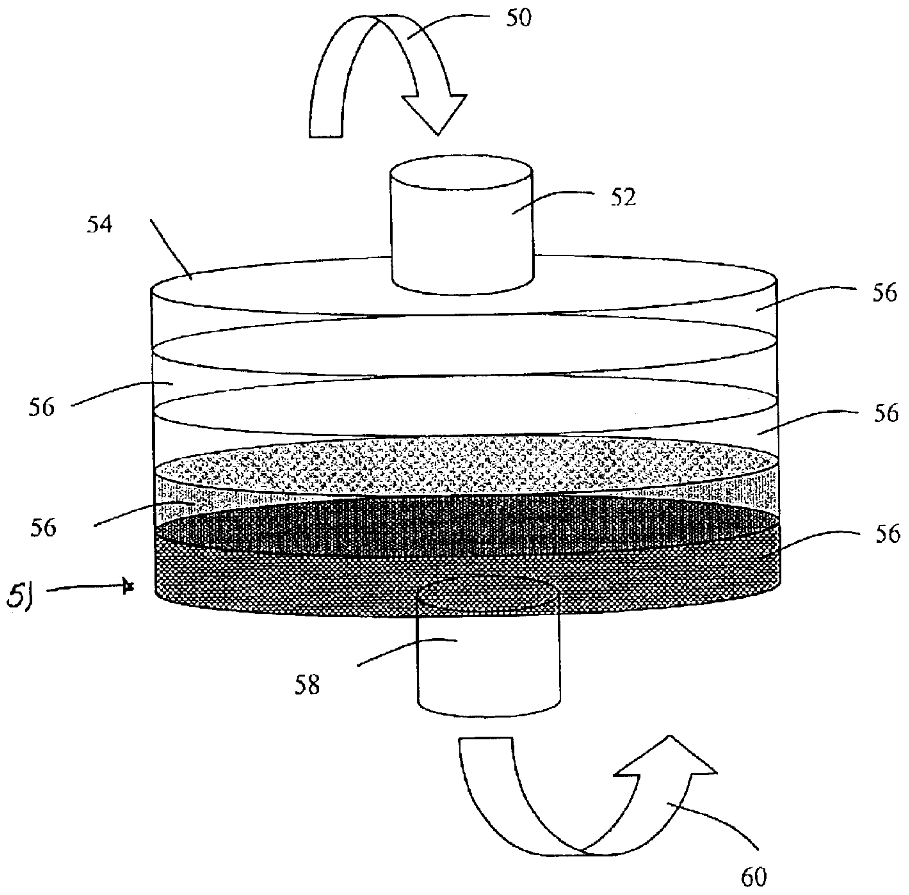

ARTICLE AND METHOD FOR ELIMINATION OF HYDROCARBON EMISSIONS FROM PRINTER EXHAUST

BACKGROUND OF THE INVENTION

1. Field of the Invention

The present invention relates to an electrophotographic printing apparatus using a hydrocarbon liquid toner and particularly to a method and article for the elimination of hydrocarbons from printer exhaust.

2. Background of the Art

Hydrocarbon filters are known in the industrial world as effective means for substantially purifying hydrocarbon-laden air that may be the by-product of, for example, industrial processing equipment or automobiles. Most frequently the filters utilize a regenerable carbon adsorbent in large quantities. Such a product is expensive, non-disposable, and may be very heavy, in addition to requiring additional equipment or recycling for regeneration of the filter.

Electrophotography is a well known commercial process and may incorporate the use of either liquid or dry toners. An electrophotographic apparatus that uses liquid toner realizes several advantages over an electrophotographic apparatus that uses dry toner. One such advantage is the achievement of finer resolution prints due to smaller particle size. Because the particles are smaller, a lower mass of toner is required to print to the necessary optical density, reducing the material cost per page. Another advantage is liquid toner's lack of airborne dry toner particulate (which are known carcinogens). Liquid toner also tends to have a longer shelf life because of increased charge stability as compared to dry toner.

A liquid electrophotographic toner, unlike its dry toner counterparts, contains a significant amount of a hydrocarbon solvent that helps to produce the fine resolution for which liquid toners are preferred. That solvent, however, must be removed from the image at some point in the printing process before the user receives the printed page. Some printer designers choose to evaporate the solvent while the image is still on an intermediate transfer member or on the photoreceptor, and then transferring the substantially dry image to the final substrate. Some manufacturers choose to absorb the solvent from an intermediate transfer member (or photoreceptor) with a specially coated roll. Then typically a beat roll is used to evaporate the absorbed solvent. Still other manufacturers choose to leave the solvent in the image until the image reaches the substrate and then the solvent is evaporated, usually in a fusing step. In any case, the solvent is removed from the image or hardware through evaporation.

Typically, the evaporated solvent is collected in a substantially airtight container and circulated through a condensing unit to condense the solvent back into a liquid. The air that is exhausted is substantially hydrocarbon-free, although some manufacturers will use an additional carbon absorbent filter to ensure exhaust quality. Some of the negative characteristics of the printers that use these solutions include: a bulkier printer to accommodate extra hardware, an increased cost due to extra components, the necessity of a recycling or disposal system for condensed solvent, and the necessity to recycle used carbon filters.

SUMMARY OF THE INVENTION

There are significant problems associated with the need to collect all of the airborne hydrocarbons for condensation and disposal. A resolution according to the present invention uses a substantially passive method and article for collecting and disposing of the airborne hydrocarbons simply and in an environmentally-friendly manner.

A method for collecting and disposing of waste airborne hydrocarbons includes providing an air/hydrocarbon mixture as airborne hydrocarbons in either vapor or mist form in an electrophotographic imaging process, directing the air/hydrocarbon mixture to an oleophilic absorbent bed or surface, absorbing the hydrocarbon out of the air/hydrocarbon mixture without necessarily first condensing it. For example, the term "absorbing without condensing" is defined by a test wherein a vapor phase carrying 25% by volume of hydrocarbons at 20° C. and 760 mm Hg contacts the absorbent media for no more than three minutes with return flow of the vapor through the media, and at least 50% of the total hydrocarbon is absorbed into the media without having more than 10% by weight of the original hydrocarbon in the vapor phase condense as droplets from the air/hydrocarbon mixture on the media. It is preferred in the practice of the invention, and enabled by the herein described practices to limit condensation under those conditions to less than 5%, less than 3% and even less than 1%, while at the same time removing at least 70% of the original hydrocarbons, at least 80% of the original hydrocarbons, at least 90% of the original hydrocarbons, at least 95% of the original hydrocarbons, and more than 98% or more than 99% of the original hydrocarbons. After removing hydrocarbon from the vapor phase, the process continues by exhausting the reduced hydrocarbon-content air, which can be essentially hydrocarbon-free air, out of the electrophotographic apparatus. There is no need to condense the hydrocarbons as droplets out of the air, because as they pass over and through the bed or cartridge filled with absorbent media, a substantial majority (e.g., at least 80%, preferably at least 90% by weight of the hydrocarbon) is pulled from the air in a gaseous state and captured. The advantage of absorption rather than condensation is that the hydrocarbon, when absorbed, is bound more strongly within the removal system. When merely condensed, the hydrocarbon liquid remains as a flowable liquid lightly attached by surface tension to the surface of the condensing surface. When the flow of air around or through the absorbent cartridge or pod is reduced or stopped, the cartridge or pod may simply be exchanged for another. In a preferred embodiment, the absorbent prevents impermissible toxic leaching (that is leaching of the hydrocarbon solvent from the absorbent) into the environment and might be disposed of in a regular waste stream, such as trash collection and landfill disposal. The absorbent may also have a catalyst, bacteria, or other active ingredient therein that will assist in the breakdown of the ink into environmentally acceptable materials, and/or the absorbent may be additionally hydrophilic.

The absorbent media is referred to as "non-leachable" in preferred practices of the present invention. The term non-leachable has a purpose and a meaning according to the practice of the invention. After absorption of the hydrocarbon has stabilized in the media (that is, after absorption, the media is allowed to sit at room temperature (20° C.) and pressure (760 mm Hg) for four hours), the media with 3% by weight hydrocarbon liquid absorbed therein (with at least 50% by weight of the hydrocarbon comprising C10, C11, and C12 linear hydrocarbons, and with less than 5% comprising <C8 hydrocarbons) is contacted with deionized water at 30° C. for two hours. The term "non-leachable" means that less than 10% by total weight of the absorbed hydrocarbon is leached from the absorbent into the water phase. It is preferred that less than 5% of the absorbed hydrocarbon is absorbed into the water after two hours.

In various embodiments of the method, air (the vapor stream with gaseous hydrocarbon) may be directed to the absorbent with a fan, or pump, for example. Other airflow in the apparatus may be encouraged or introduced through ventilation holes or additional fans. Some manufacturers may choose to control the direction of the airflow with a duct or similar directing means.

Another aspect of the invention is a filter or cartridge for collecting the airborne hydrocarbons. Embodiments of the cartridge will vary in complexity with the amount of vapor to be collected and the type of air direction employed. Some embodiments might simply be a two-part pod comprised substantially of mesh filled with one or more absorbents. Other embodiments include a canister-like cartridge with an inlet and outlet so that hydrocarbon-laden air can be blown or pumped into or through the absorbent(s) therein. In a pod or cartridge that contains very densely packed absorbent(s), it may also be necessary to include air channels or pockets strategically placed throughout the pod or cartridge article.

Many different structural and functional materials may be used in the article. Presumably, cost and weight are factors and such costs are easily managed by using lightweight plastic or even disposable (e.g. cardboard) housing or support materials. It is an aspect of this invention, to effect convenient disposal, and as such, disposable materials are preferred. In the pod-like design, a substantial amount of the available surface area is covered with a mesh or screen, but may include or substitute non-woven cloth (e.g. polyethylene) that may also be oleophilic.

Yet another element of the invention is an oleophilic, non-leaching absorbent for the hydrocarbon solvent. Embodiments of the absorbent include fibrous, porous, particulate, or other structural materials that are oleophilic and will attract and retain hydrocarbons in the structure. For example, such commercial materials as organic fabrics; organic reticulated foams; hydrophobized particles; compacted layers of absorbent materials; non-woven organic fiber structures; and the like may be used.

Examples of commercial materials that have been proven particularly effective that have passed landfill leach testing are Enviro-bond™ 403 absorbent, Imbiber Beads® absorbent and Bilge Boom™ oil-absorbent sheets. A preferred absorbent is the Imbiber Beads® absorbent, preferred for its ability to quickly absorb and encapsulate the hydrocarbon solvent without quickly solidifying. In another embodiment, the oleophilic absorbent may be combined with other absorbents, such as hydrophilic absorbents, in order to match the absorbency characteristics of a particular solvent, or to deal with minimal amounts of water vapor or condensation that may appear during venting.

BRIEF DESCRIPTION OF THE FIGURES

FIG. 1: Top view of an embodiment of a vapor collection cartridge with a circular, pod-like cartridge that can be filled with a chosen absorbent.

FIG. 2: Side view of the cartridge of FIG. 1.

FIG. 3: Exploded side view (cut away) diagram of an alternative cartridge construction.

FIG. 4: Cutaway side view of an adaptation or embodiment of a cartridge that enables air to flow through the cartridge.

FIG. 5: An alternative cartridge design that allows for pumping air into or through the cartridge.

FIG. 6: An embodiment of a cartridge or pod using layered absorbents to trap vapors and mists of varying size.

DETAILED DESCRIPTION OF THE INVENTION

Figure 7:
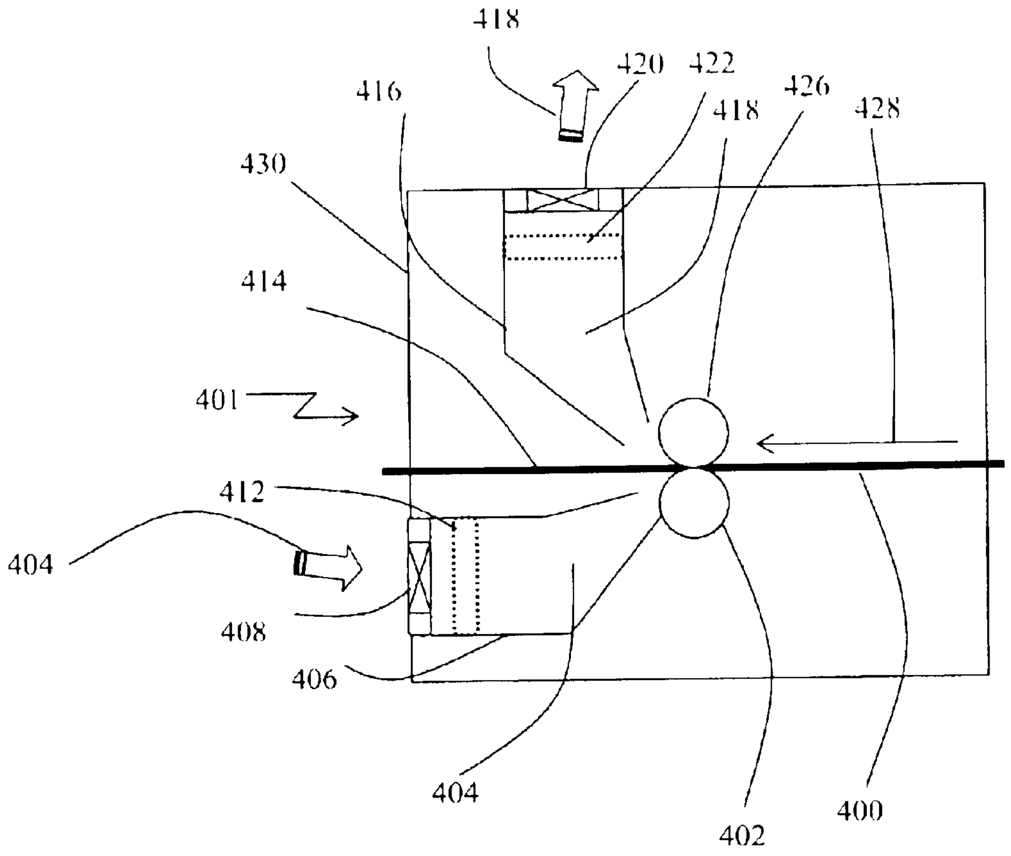
FIG. 7: Another alternative embodiment of the vapor handling method using a pod-like or canister-like cartridge.

In this specification, some terms used will have the following meanings. Odor: Since each organism's perception of smell will vary, the term "odor" is used here to refer generically to a smell or fragrance, pleasant or unpleasant, that can be sensed by a mammalian olfactory system. Vapor: Airborne hydrocarbon molecules that may be generated through general evaporation at room temperature or through heating. Mist: Airborne hydrocarbon droplets of varying size. Mist may be formed as fusing rolls spin and throw off liquid, as vapor cools and condenses in the air, or if the carrier liquid is not heated sufficiently to turn all of the liquid to vapor and droplets are carried into a gas phase.

In a liquid electrophotographic process, the carrier liquid vapor and mist that is generated cannot be simply exhausted from the machine for a variety of reasons. One reason is that hydrocarbon vapor and mist that is generated through a heating step is very likely to condense on nearby surfaces (e.g., walls, desks, ceilings, etc.) if it is allowed to exit the machine unchecked. While miniscule amounts of this deposited hydrocarbon are probably undetectable, and likely harmless, a continuous build up over time is certainly undesirable.

Another reason hydrocarbon vapor and mist are not simply allowed to exhaust from a home or office liquid electrophotographic apparatus is that the tiny airborne particles are easily introduced into humans through inhalation. While the hydrocarbon as a liquid is substantially odorless, when the hydrocarbon is heated during a fusing or evaporation step, the carbon components evaporate at different rates. Some of the components in the carrier liquid have an offensive odor, some have a more pleasant odor and actually work to neutralize the more offensive components. When the components are heated and they evaporate at different rates, the most offensive carbons are the first to reach the operator, giving him or her a perception of bad smell. Most home and office liquid electrophotographic device manufacturers will prefer or require that their products not have such an unpleasant odor. Removal of all hydrocarbon effluent is the solution to that problem.

Probably the most important reason for not allowing hydrocarbon vapor and mist to exhaust from the machine into a home or workplace involves the continued inhalation of even relatively harmless chemicals. Although the U.S. Environmental Protection Agency has not come out with guidelines regulating explicitly how much hydrocarbon vapor and mist is permissible and how much is harmful, there are studies and legal jurisdictions from which such information may be inferred. In Europe and the United States, there are similar exposure limits for hydrocarbon mists and vapor. In the U.S., occupational/industrial limits (designed for people working with large quantities of hydrocarbons, such as in processing or manufacturing plants) are set by such organizations as NIOSH (National Institute for Occupational Safety and Health) and OSHA (Occupational Safety and Health Association), and might not be applicable, but in the absence of other regulation provide preliminary guidelines.

A critical part of this invention is the selection of the absorbent. Where an absorbent is mentioned, such materials may comprise, but are not limited to: cellulose that has been treated to be oleophilic and substantially hydrophobic, elastomeric polymers, polymers (e.g., polypropylene, polyvinyl resins, polyamides, etc.) and other imbibitive and oleophilic media. Such media may be combined with other media or absorbents to accomplish the inventive purpose of encapsulating the hydrocarbon vapor and mist. The combination of absorbent and trapped solvent may even be non-leachable (for example, no more than 5% by weight total of dissolved, adsorbed or absorbed material is not removed by ambient conditions such as 20% moisture content in soil, at 20° C., over twelve months, with the capacity of the absorbent at 5% for the material retained), meeting stringent environmental standards. By leachable it is meant that organic liquid will not be removed at a rate greater than 5% total weight of organic liquids per year when contacted with distilled water at 20° C., with a replacement rate of the water of 1 liter/month/10 $m^2$ of surface area of solid containing the organic liquid. This is important because a landfillable cartridge can be an essential issue to consumers.

One description of the method and apparatus of the invention includes a method of removing airborne hydrocarbons from liquid electrophotographic printer exhaust comprising generating airborne hydrocarbon droplets as either vapor or mist during the transportation of electrophotographic ink or toner, directing substantially all of the air and hydrocarbon droplet mixture to a central collection point, forcing the air/droplet mixture to and through an oleophilic, substantially non-leaching collection media, and exhausting substantially hydrocarbon-free air from the electrophotographic printer. The method may further comprise inducing pressure in the printer with air pressure reduction to pull the exhaust through the collection media, for example with a pump or fan used to produce air pressure reduction. The method may comprise inducing airflow in the printer with ventilation holes or by the addition of a fan to provide a fresh air inlet. The air/hydrocarbon mixture may be directed to the collection media by a transportation system.

A filter for the collection and disposal of airborne hydrocarbons in a liquid electrophotographic printer may comprise a housing having at least an inlet, and an oleophilic absorbent contained within said housing. The filter housing may substantially comprise a screen-like mesh, the screen-like mesh acting as the inlet, and may have the housing as a three-dimensional cartridge, having at least two opposing (parallel) sides, that is substantially impervious to airborne hydrocarbons. In this structure, the cartridge may have one of the opposing sides contain the inlet, and the opposite side contains an outlet. The filter may have the absorbent portion comprises a particulate oleophilic absorbent that is enclosed within an oleophilic cloth or non-woven material. The absorbent portion may be comprised of a plurality of absorbents blended together to meet specific absorbent needs. The filter may further comprise the inclusion of air channels through the absorbent layer. An electrophotographic printing apparatus may comprise a source of electrophotographic ink or toner, an electrophotographic printing surface, a source of imaging radiation, and a liquid electrophotographic printer exhaust, the exhaust further comprising: a source of air with airborne hydrocarbon droplets as either vapor or mist during the transportation of electrophotographic ink or toner, a flow system for moving substantially all of the air and hydrocarbon droplet mixture to a central collection point, in the central collection point, a substantially non-leaching collection media, and an exhaust for air leaving the central collection point.

FIG. 1 shows one structure for a hydrocarbon vapor and mist absorbent article 1. In its most basic form, the article or cartridge is a holder for the absorbent. The holder may be constructed entirely of a mesh or screen 4, it may be comprised of a non-woven oleophilic cloth, or it may comprise sturdy frames 2, 6 in combination with the mesh, screen or cloth 4. The actual shape of the article is not critically important (not functional), so long as the shape selected is designed to prevent gaps in the structure and leakage of hydrocarbon vapor.

One combination of frame 12 and 14 and mesh 10 is shown in FIG. 2. In the example, the frame is in two parts 12 and 14 for ease of media exchange, but in reality, if media is pre-packaged in a pod and the pod is disposed of after expiration of its useful life, there is no need for two discrete halves or portions. A substantial portion of the surface of the pod or cartridge is shown as covered with a fine mesh 10, to facilitate the introduction of vapor and to contain the absorbent media (not shown) therein.

FIG. 3 shows an exploded cross-section view of how certain components of a structure of the invention can fit together in one type of embodiment. The frame 26 primarily keeps minimal structure and holds the components together. This is desirable so that as much surface area as possible is exposed to the hydrocarbons. At least two surfaces of the vapor capture cartridge are shown to comprise a mesh or other porous material 20. Such porous material 20 might be fabric or non-woven oleophilic cloth, for example. Between the two mesh materials 20 or hydrocarbon vapor permeable materials is an absorbent material 24. Although there are many oleophilic absorbents available, the best absorbents are light, work quickly, and are reluctant to become a solid mass. For this reason, blending different absorbents has been shown to work well. The materials are preferably selected with properties in mind that attract and/or bind hydrocarbons to the surface or pores of the material without the need for condensation of the hydrocarbon. It would be desirable to provide chemically active (reactive) and/or physically active (hydrophobic, oleophilic) sites to a material or materials used in the absorbent to advance the practice of the present invention. For example, not only may commercial, oleophilic polymeric materials be selected, but also those polymeric materials may be modified by the addition of pendant groups, block copolymeric groups, polymeric segments, particulate or fiber additives, or other forms of materials or treatments (e.g., corona discharge, pulsed excimer laser activation, quasi-amorphization, partial oxidation, partial reduction, etc.) to enhance these physical properties. It is also possible to intermingle the use of absorbents and adsorbents in a blended or stratified structure.

FIG. 4 is also a cutaway view showing one improvement to enhance vapor flow through a dense bed of media 34. The optional frame (shown here as 30) connects opposite mesh or non-woven cloth surfaces 32 that enclose the oleophilic media 34. In the enhancement, channels 36 run into the bed of media 34 from either mesh surface. Some channels 36 may entirely run through the bed, others may not. The channels 36 may be created with solid walls, such as with solid tubing, with mesh or perforated tubing, or even by reinforcing the media along the channel, as with heat.

FIG. 5 shows a vapor/mist capture cartridge 39 that is a little less passive. The cartridge has a housing 41 constructed of a material that is impervious to hydrocarbon vapor and mist. It might be preferable to use a biodegradable or recyclable material, to match the disposal scheme of the absorbent 42 in the housing 41. The shape of the housing/cartridge is entirely non-functional and merely needs to be adapted to fit inside any electrophotographic printing apparatus or a particular electrophotographic printing apparatus. What makes this design a little less passive is that one or more pumps (not shown) may be employed to direct the air into the cartridge 39 by means of an inlet 40 and one or more pumps 44 may be used to pull substantially hydrocarbon-free air out of the cartridge through an outlet 43.

FIG. 6 is a cartridge 51 similar to that in FIG. 5, having a housing 54 that is impervious to hydrocarbon vapor and mist, an inlet 52 into which hydrocarbon-laden air may be blown or pumped (arrow 50 shows the direction of flow), and an outlet 58 from which substantially hydrocarbon-free air is expelled (arrow 60 shows the direction of exit flow). This embodiment may be used with or with out pumps. The main difference between the cartridge 39 in FIG. 5 and the cartridge in FIG. 6 is that the absorbent 56 in FIG. 6 is comprised of layers of oleophilic (and possibly some degree or number of hydrophilic layers) media, arranged with increasing density (e.g., reduced porosity) starting at the inlet. Although the FIG. 6 shows five layers 56, there may be as few as two layers, or many more than five layers, depending on the system hardware and cartridge design. It is also possible to intermingle the use of absorbents and adsorbents in a blended or stratified structure.

FIG. 7 shows the design of the testing apparatus 401 used in this invention. Vapor is generated in a fusing step performed by two contacting heated fusing rolls 402, 426. A printed page (not shown) is laid face up on an input platen 400. Fusing drive rolls (not shown) and a motor (not shown) cause the fusing rolls 402 and 406 to turn. The printed page is pushed into (arrow 428 shows direction) the fusing nip between the fusing rolls 402 and 406 and emerges on the output platen 414. In the nip, the liquid carrier solvent is evaporated and it, too, exits the nip at the side of the output platen 414. A first duct 406 is then added under the output platen 414, leading to the printer housing 430. The first duct 406 is merely an air-directional unit, as indicated by the arrows 404. If a pump or pumps are used, the air directional components might be hoses or tubes. The embodiment of FIG. 7 shows a fan 408 at the entrance to the first duct 406 for the purpose of introducing air into the simulated printing apparatus. Optionally, an air filter or air cleaner 412 may be included. A second duct 416 or air directing unit is added over the output platen 414 and quite close to the fusing nip. The second duct is also shown fitted with a fan 420 for pulling air back out of the apparatus (see arrows 418). The absorbent cartridge 422 is shown in the air stream exiting 418 the printer. It is not necessary for the absorbent 422 to be placed upstream of the fan 420, but such an arrangement allows for fewer opportunities for airborne hydrocarbons to escape.

Figure 8:
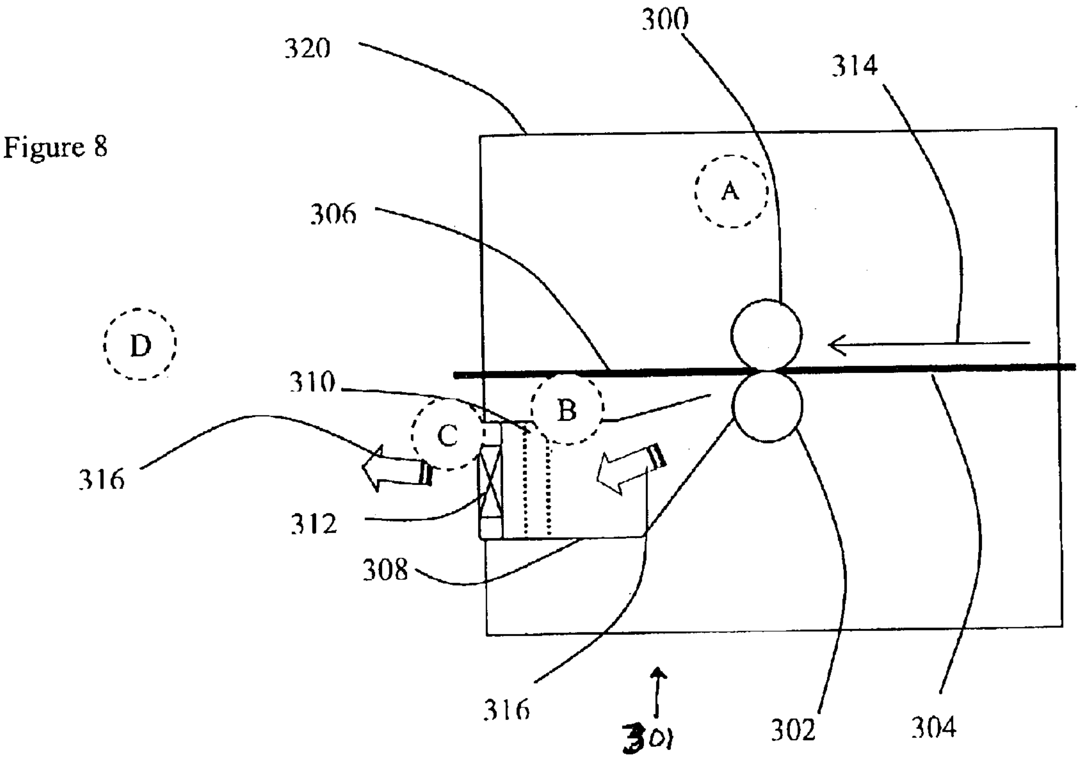
FIG. 8: Another alternative embodiment of the vapor handling method using a pod-like cartridge.

FIG. 8 shows a configuration that was designed to test absorption systems 310 with less hardware. As in FIG. 7, two heated fuser rolls 300 and 302, an input platen 304, an output platen 306, and a housing 320 are used in a testing apparatus 301 that fuses liquid toner or ink images on printed pages, evaporating the carrier solvent. Arrow 314 shows the direction the paper is fed. In this configuration, only one duct 308 is in place, and pages are fused face down. The output platen 306 has large holes or slots drilled or otherwise provided (not shown) in it up to the fusing rolls 300 and 302, to allow evaporated solvent to be pulled away from the page by the fan 312. The arrows 316 show air movement direction and the absorbent cartridge 310 is upwind of the fan 312. Data was collected during the experiments at various points in the machine, labeled in FIG. 8 with letters A, B, C, and D.

Examples and Experiments

Generally speaking, hydrocarbon vapors and mists are not regulated in the same way. Vapor is measured in parts per million (ppm), while mist is measured in micrograms/cubic meter. Different air sampling devices are used for each. Carbon tubes may be used for the vapor (other options include the use of a coconut shell adsorbent, paper tubes, activated carbon tubes, porous polystyrene foams, reticulated polyurethane foams, reticulated polyolefine foams, and other porous or open hydrophobic materials), while the mist is collected using a specially-sized blown glass filter. The following tables compare different fusing configurations and absorbents for their effectiveness in capturing hydrocarbon vapor. For the Norpar® 12 tests, the odor detection limit is around 30 ppm.

In testing for mist and vapor with and without the absorbents and prototype cartridge designs, two different fusing configurations were used, but there are certainly many other variations possible that are within the skill and design of the artisan. The configurations used for these tests are shown in FIGS. 7 and 8.

In the following data tables, Absorbent A refers to Imbiber Beads® manufactured by Imbibitive Technologies; Absorbent B refers to Bilge Boom Oil Absorbent Sheets; Absorbent C refers to Enviro-bond™ 403; and Absorbent D refers to RamSorb

TABLE 1-REFER ALSO TO FIG. 7

Ink based in NORPAR ® 12 printed on high quality laser paper at full coverage. Fusing temperatures and conditions vary, as do the locations of air sampling devices. Vapor testing lasts for five minutes of uninterrupted fusing per test.

| Tester Location/Conditions | Actual Temp. | Vapor (PPM) | Vapor repeat (PPM) |
|---|---|---|---|
| Carbon air sampler around one inch from fusing nip, where the vapor is generated. There are no fans to move the air into or out of the fuser enclosure. | ~135° C. | 1739.29 | 658.31 |
| Carbon air sampler right at the fan opening in the fuser enclosure. The fans are not on, so the concentration is simply what is leaving the box. | ~135° C. | 514.82 | 429.57 |
| Carbon air sampler around one inch from fusing nip, where the vapor is generated. There are no fans to move the air into or out of the fuser enclosure. | <100° C. | 735.61 | 877.17 |
| Carbon air sampler right at the fan opening in the fuser enclosure. The fans are not on, so the concentration is simply what is leaving the box. | <100° C. | 251.7 | 218.95 |
| Carbon air sampler within one inch of enclosure positioned in the exhaust stream. Upper fan is on at 40%, lower fan is on at 50%. | ~135° C. | 120.27 | 143.78 |
| Carbon air sampler within one inch of enclosure positioned in the exhaust stream. Upper fan is on at 40%, lower fan is on at 50%. | ~135 ° C. | 138.62 | 134.26 |

TABLE 1-REFER ALSO TO FIG. 7-continued

Ink based in NORPAR ® 12 printed on high quality laser paper at full coverage. Fusing temperatures and conditions vary, as do the locations of air sampling devices. Vapor testing lasts for five minutes of uninterrupted fusing per test.

| Tester Location/Conditions | Actual Temp. | Vapor (PPM) | Vapor repeat (PPM) |
|---|---|---|---|
| Carbon air sampler within one inch of enclosure positioned in the exhaust stream. Upper fan is on at 40%, lower fan is on at 50%. | <100° C. | 79.04 | 82.12 |
| Carbon air sampler within one inch of enclosure positioned in the exhaust stream. Upper fan is on at 40%, lower fan is on at 50%. | <100° C. | 89.77 | 91.17 |

TABLE 2-REFER ALSO TO FIG. 7

Ink based in ISOPAR ® M printed on high quality laser paper at full coverage. Fusing temperatures and conditions vary, as do the locations of air sampling devices. Vapor testing lasts for five minutes of uninterrupted fusing per test.

| Tester Location/Conditions | Actual Temp. | Vapor (PPM) | Vapor repeat (PPM) |
|---|---|---|---|
| Carbon air sampler around one inch from fusing nip, where the vapor is generated. There are no fans to move the air into or out of the fuser enclosure. | ~135° C. | 557 | 169 |
| Carbon air sampler right at the fan opening in the fuser enclosure. The fans are not on, so the concentration is simply what is leaving the box. | ~135° C. | 83 | 130 |
| Carbon air sampler around one inch from fusing nip, where the vapor is generated. There are no fans to move the air into or out of the fuser enclosure. | <100° C. | 57 | 179 |
| Carbon air sampler right at the fan opening in the fuser enclosure. The fans are not on, so the concentration is simply what is leaving the box. | <100° C. | 29 | 57 |
| Carbon air sampler within one inch of enclosure positioned in the exhaust stream. Upper fan is on at 40%, lower fan is on at 50%. | ~135° C. | 0 | 0 |
| Carbon air sampler within one inch of enclosure positioned in the exhaust stream. Upper fan is on at 40%, lower fan is on at 50%. | ~135° C. | 16 | 22 |
| Carbon air sampler within one inch of enclosure positioned in the exhaust stream. Upper fan is on at 40%, lower fan is on at 50%. | <100° C. | 0 | 0 |
| Carbon air sampler within one inch of enclosure positioned in the exhaust stream. Upper fan is on at 40%, lower fan is on at 50%. | <100° C. | 0 | 22 |
| Carbon air sampler around one inch from fusing nip, where the vapor is generated. There are no fans to move the air into or out of the fuser enclosure. | ~155° C. | 258 | NA |
| Carbon air sampler right at the fan opening in the fuser enclosure. The fans are not on, so the concentration is simply what is leaving the box. | ~155° C. | 66.4 | NA |
| Carbon air sampler within one inch of enclosure positioned in the exhaust stream. Upper fan is on at 40%, lower fan is on at 50%. | ~155° C. | 24.9 | 18.1 |

TABLE 3-REFER ALSO TO FIG. 8

Ink based in NORPAR ® 12 printed on high quality laser paper at full coverage. Fusing temperatures and conditions vary, as do the locations of air sampling devices. Vapor testing lasts for five minutes of uninterrupted fusing per test. Prior to this experiment the tester was re-configured.

| Tester Location/Conditions | Actual Temp. | Vapor (PPM) | Vapor repeat (PPM) |
|---|---|---|---|
| Carbon air sampler four to six inches from fusing nip, where the vapor is generated. Fan below the output tray is running at 50%. | ~165° C. | 49.55 | 23.33 |
| Carbon air sampler right over the lower fan duct, under the output tray. Fan is on at 50%. | ~165° C. | 57.59 | 16.79 |
| Air sampled from fan exhaust, right at the fusing housing. | ~165° C. | 55.64 | 45.01 |
| Air sampled from fan exhaust, right at the fusing housing. | ~165° C. | 37.67 | NA |
| Sampler device attached to operator. Distance from fan exhaust varied by one to three feet. | ~165° C. | 18.39 | NA |
| Sampler device attached to operator. Distance from fan exhaust varied by one to three feet. | ~165° C. | 16.56 | 13.88 |

TABLE 4-REFER ALSO TO FIG. 7

Ink based in NORPAR ® 12 printed on high quality laser paper at full coverage. Fusing temperatures and conditions vary, as do the locations of air sampling devices. Vapor testing lasts for five minutes of uninterrupted fusing per test. This testing was done with two fans: one introducing air and one pulling air through. A pod filled with an absorbent was placed in the exhaust stream to capture hydrocarbon vapor on its way out.

| Tester Location/Conditions | Actual Temp. | Vapor (PPM) | Vapor repeat (PPM) |
|---|---|---|---|
| ABSORBENT A | | | |
| Vapor collection tube ~1–2" from fan exhaust | ~165° C. | 10.54 | 19.92 |
| Vapor collection tube ~6–8" from fan exhaust | ~165° C. | 8.17 | 14.22 |
| ABSORBENT B | | | |
| Vapor collection tube ~1–2" from fan exhaust | ~165° C. | 5.83 | 22.38 |
| Vapor collection tube ~6–8" from fan exhaust | ~165° C. | 7.9 | 15.39 |

TABLE 5-REFER ALSO TO FIG. 8

Ink based in NORPAR® 12 printed on high quality laser paper at full coverage. Fusing temperatures and conditions vary, as do the locations of air sampling devices. Vapor testing lasts for five minutes of uninterrupted fusing per test. The testing was done with one fan blowing air from the inside of the printer. An absorbent-filled pod was placed in the exhaust stream to collect the hydrocarbons.

| Tester Location/Conditions | Actual Temp. | Vapor (PPM) | Vapor repeat (PPM) |
|---|---|---|---|
| Absorbent A | | | |
| Vapor collection in box at the top, right over the nip | ~165° C. | 641.02 | NA |
| Vapor collection tube at fan exhaust | ~165° C. | 67.84 | 109.08 |
| Vapor collection tube on operator | ~165° C. | 37.64 | 25.7 |
| Vapor collection tube ~2–3' away | ~165° C. | 7.64 | 13.05 |
| Vapor collection tube ~8' away | ~165° C. | 6.29 | 13.36 |
| Absorbent C | | | |
| Vapor collection in box at the top, right over the nip | ~165° C. | 135.22 | NA |
| Vapor collection tube at fan exhaust | ~165° C. | 31.8 | 64.24 |
| Vapor collection tube on operator | ~165° C. | 32.36 | 25.05 |
| Vapor collection tube ~2–3' away | ~165° C. | 21.76 | 24.5 |
| Vapor collection tube ~8' away | ~165° C. | 13.25 | 15.87 |
| Absorbent A + C | | | |
| Vapor collection in box at the top, right over the nip | ~165° C. | 127.5 | NA |
| Vapor collection tube at fan exhaust | ~165° C. | 59.88 | 32.14 |
| Vapor collection tube on operator | ~165° C. | 27.4 | 23.97 |
| Vapor collection tube ~2–3' away | ~165° C. | 18.52 | 23.32 |
| Vapor collection tube ~8' away | ~165° C. | 13.71 | 14.92 |
| Absorbent D | | | |
| Vapor collection in box at the top, right over the nip | ~165° C. | 1091.29 | NA |
| Vapor collection tube at fan exhaust | ~165° C. | 27.66 | 59.33 |
| Vapor collection tube on operator | ~165° C. | 45.58 | 45.5 |

Similarly, data regarding the formation of hydrocarbon mist was also obtained. The tester configuration used are also those depicted in FIGS. 7 and 8.

TABLE 6-REFER ALSO TO FIG. 7

Ink based in NORPAR® 12 printed on high quality laser paper at full coverage. Fusing temperatures and conditions vary, as do the locations of air sampling devices. Aerosol mist testing lasts for five minutes of uninterrupted fusing per test.

| Tester Location/Conditions | Actual Temp. | Mist $mg/m^3$ | Mist $mg/m^3$ repeat |
|---|---|---|---|
| Mist collection filter around two inches from upper fan opening. Fans are not on. | ~135° C. | 27.26 | 28.54 |
| Mist collection filter around eight inches from upper fan opening. Fans are not on. | ~135° C. | 27.12 | 28.26 |
| Mist collection filter around two inches from upper fan opening. Fans are not on. | <100° C. | 24.28 | 29.11 |
| Mist collection filter around eight inches from upper fan opening. Fans are not on. | <100° C. | 27.83 | 26.7 |
| Mist collection filter around two inches from upper fan opening. Upper fan is on at 40% and lower fan is on at 50%. | ~135° C. | 25.56 | 26.41 |
| Mist collection filter around eight inches from upper fan opening. Upper fan is on at 40%, lower fan is on at 50%. | ~135° C. | 25.13 | 26.13 |

TABLE 6-REFER ALSO TO FIG. 7-continued

Ink based in NORPAR® 12 printed on high quality laser paper at full coverage. Fusing temperatures and conditions vary, as do the locations of air sampling devices. Aerosol mist testing lasts for five minutes of uninterrupted fusing per test.

| Tester Location/Conditions | Actual Temp. | Mist $mg/m^3$ | Mist $mg/m^3$ repeat |
|---|---|---|---|
| Mist collection filter around two inches from upper fan opening. Upper fan is on at 40% and lower fan is on at 50%. | <100° C. | 25.7 | 25.7 |
| Mist collection filter around eight inches from upper fan opening. Upper fan is on at 40%, lower fan is on at 50%. | <100° C. | 24.99 | NA |

TABLE 7-REFER ALSO TO FIG. 7

Ink based in ISOPAR® M printed on high quality laser paper at full coverage. Fusing temperatures and conditions vary, as do the locations of air sampling devices. Aerosol mist testing lasts for five minutes of uninterrupted fusing per test.

| Tester Location/Conditions | Actual Temp. | Mist $mg/m^3$ | Mist $mg/m^3$ repeat |
|---|---|---|---|
| Mist collection filter around two inches from upper fan opening. Fans are not on. | ~135° C. | 20 | 180 |
| Mist collection filter around eight inches from upper fan opening. Fans are not on. | ~135° C. | 13 | 69 |
| Mist collection filter around two inches from upper fan opening. Fans are not on. | <100° C. | 13 | 56 |
| Mist collection filter around eight inches from upper fan opening. Fans are not on. | <100° C. | 5 | 19 |
| Mist collection filter around two inches from upper fan opening. Upper fan is on at 40% and lower fan is on at 50%. | ~135° C. | 0 | NA |
| Mist collection filter around eight inches from upper fan opening. Upper fan is on at 40%, lower fan is on at 50%. | ~135 ° C. | 0 | 10 |
| Mist collection filter around two inches from upper fan opening. Upper fan is on at 40% and lower fan is on at 50%. | <100° C. | 9 | NA |
| Mist collection filter around eight inches from upper fan opening. Upper fan is on at 40%, lower fan is on at 50%. | <100° C. | 6 | 12 |

TABLE 8-REFER ALSO TO FIG. 8

Ink based in NORPAR® 12 printed on high quality laser paper at full coverage. Fusing temperatures and conditions vary, as do the locations of air sampling devices. Aerosol mist testing lasts for five minutes of uninterrupted fusing per test. Prior to this test the tester was reconfigured. Only the lower fan was installed and in use.

| Tester Location/Conditions | Actual Temp. | Mist $mg/m^3$ | Mist $mg/m^3$ repeat |
|---|---|---|---|
| Mist collection filter positioned in lower fan exhaust stream. Lower fan at 50%. | ~165° C. | 1.47 | 3.58 |
| Mist collection filter positioned about 4–6 inches over the lower fan exhaust. | ~165° C. | 1.03 | 3.2 |
| Mist collection filter positioned in lower fan exhaust stream. Lower fan at 50%. | ~165° C. | 2.77 | 1.95 |
| Mist collection filter positioned about 4–6 inches over the lower fan exhaust. | ~165° C. | 1.93 | 2.13 |

TABLE 8-REFER ALSO TO FIG. 8-continued

Ink based in NORPAR ® 12 printed on high quality laser paper at full coverage. Fusing temperatures and conditions vary, as do the locations of air sampling devices. Aerosol mist testing lasts for five minutes of uninterrupted fusing per test. Prior to this test the tester was reconfigured. Only the lower fan was installed and in use.

| Tester Location/Conditions | Actual Temp. | Mist mg/m³ | Mist mg/m³ repeat |
|---|---|---|---|
| Mist collection filter attached to operator (about 6–10" in front of lower fan exhaust) | ~165° C. | 2.39 | NA |

TABLE 9-REFER ALSO TO FIG. 7

Ink based in NORPAR ® 12 printed on high quality laser paper at full coverage. Fusing temperatures and conditions vary as do the locations of air sampling devices. Aerosol mist testing lasts for five minutes of uninterrupted fusing per test. This testing was done with two fans: one introducing air and one pulling air through. A pod filled with an absorbent was placed in the exhaust stream to capture hydrocarbon mist on its way out.

| Tester Location/Conditions | Actual Temp. | Mist mg/m³ | Mist mg/m³ repeat |
|---|---|---|---|
| ABSORBENT A | | | |
| Vapor collection tube ~1–2" from fan exhaust | ~165° C. | 0.79 | 1.37 |
| Vapor collection tube ~6–8" from fan exhaust | ~165° C. | 1.35 | 1.85 |
| ABSORBENT B | | | |
| Vapor collection tube ~1–2" from fan exhaust | ~165° C. | 1.37 | 2.57 |
| Vapor collection tube ~6–8" from fan exhaust | ~165° C. | 0.98 | 1.37 |

TABLE 10-REFER ALSO TO FIG. 8

Ink based in NORPAR ® 12 printed on high quality laser paper at full coverage. Fusing temperatures and conditions vary, as do the locations of air sampling devices. Aerosol mist testing lasts for five minutes of uninterrupted fusing per test. The testing was done with one fan blowing air from the inside of the printer. An absorbent-filled pod was placed in the exhaust stream to collect the hydrocarbons.

| Tester Location/Conditions | Actual Temp. | Mist mg/m³ | Mist mg/m³ repeat |
|---|---|---|---|
| Absorbent A | | | |
| Mist collection filter in fan exhaust stream | ~165° C. | 3.76 | 8.06 |
| Mist collection filter ~8" over fan exhaust stream | ~165° C. | 1.79 | NA |
| Mist collection filter about 8–10" away from fan exhaust--on operator | ~165° C. | 2.73 | 2.6 |
| Mist collection filter about 3 feet from tester | ~165° C. | 1.05 | 0.58 |
| Mist collection filter about 8 feet from tester | ~165° C. | 0.41 | 0.65 |

TABLE 10-REFER ALSO TO FIG. 8-continued

Ink based in NORPAR ® 12 printed on high quality laser paper at full coverage. Fusing temperatures and conditions vary, as do the locations of air sampling devices. Aerosol mist testing lasts for five minutes of uninterrupted fusing per test. The testing was done with one fan blowing air from the inside of the printer. An absorbent-filled pod was placed in the exhaust stream to collect the hydrocarbons.

| Tester Location/Conditions | Actual Temp. | Mist mg/m³ | Mist mg/m³ repeat |
|---|---|---|---|
| Absorbent C | | | |
| Mist collection filter in fan exhaust stream | ~165° C. | 3.57 | 4.66 |
| Mist collection filter ~8" over fan exhaust stream | ~165° C. | 3.38 | NA |
| Mist collection filter about 8–10" away from fan exhaust--on operator | ~165° C. | 4.06 | 4.02 |
| Mist collection filter about 3 feet from tester | ~165° C. | 1.22 | 1.39 |
| Mist collection filter about 8 feet from tester | ~165° C. | 0.98 | 0.91 |
| Absorbent A + C | | | |
| Mist collection filter in fan exhaust stream | ~165° C. | 5.35 | 4.67 |
| Mist collection filter ~8" over fan exhaust stream | ~165° C. | 3.91 | NA |
| Mist collection filter about 8–10" away from fan exhaust--on operator | ~165° C. | 3.36 | 4.03 |
| Mist collection filter about 3 feet from tester | ~165° C. | 1.2 | 1.3 |
| Mist collection filter about 8 feet from tester | ~165° C. | 0.98 | 1.05 |
| Absorbent D | | | |
| Mist collection filter in fan exhaust stream | ~165° C. | 1.65 | 2.85 |
| Mist collection filter ~8" over fan exhaust stream | ~165° C. | 5.32 | NA |
| Mist collection filter about 8–10" away from fan exhaust--on operator | ~165° C. | 1.24 | 2.24 |

Particular examples of commercially available materials that can act as non-leachable absorbent material:

Imbiber Beads(r) www.imbiberbeads.com<http://www.imbiberbeads.com/> made and distributed by Imbibitive Technologies Corp.

Materials described in U.S. Pat. Nos. 5,830,967; 5,539,071; 5,767,060; and 5,641,847;

RamSorb II and Ramsorb IV, www.ramsorb.com<http://www.ramsorb.com/> (RAM Environmental Technologies, Inc. 5200 Cahaba River Rd, Birmingham, Ala. 35243)

Bilge BOOM™ Oil Absorber, Eagle Marine (EiR Eagle Marine Evansville, Ind.)

OARS Skimmers by Abtech Industries (see http://www.solidwaste.com/ecommcenters/abtech.html, AbTech Industries, 4110 N Scottsdale Road, Suite 235, Scottsdale, Ariz. 85251.

Rubberizer(r) www.rubberizer.com<http://www.rubberizer.com/> From Haz-Mat Response Technologies, Inc.

Other absorbent media are described in U.S. Published Applications App20020031367; App20020031373; and App20020037181; and U.S. Pat. Nos. 6,231,758; and 5,906,572.

One skilled in the art understands that variations may be readily made in ancillary aspects of the practice of the present invention without deviating from the concepts of the invention. For example, materials used in housing, tubes and ducts, equipment used to generate reduced pressure or flow pressure, absorbent materials that meet the requirements described in the practice of the invention, novel inks and toners that are developed and the like are within the concept of the invention and would be practiced by those skilled in the art when contemplating commercialization of the invention.

What is claimed is:

1. A method of removing airborne hydrocarbons from liquid electrophotographic printer exhaust comprising generating airborne hydrocarbon droplets as either vapor or mist during the transportation of electrophotographic ink or toner, directing substantially all of the air and hydrocarbon droplet mixture to a central collection point, forcing the air/droplet mixture to and through an oleophilic, substantially non-leaching collection media, and exhausting substantially hydrocarbon-free air from the electrophotographic printer.

2. The method of claim 1 further comprising inducing pressure in the printer with air pressure reduction to pull the exhaust through the collection media.

3. The method of claim 2 wherein a fan is used to produce the air pressure reduction.

4. The method of claim 3 further comprising inducing airflow in the printer with ventilation holes.

5. The method of claim 4 further comprising inducing airflow by the addition of a fan to provide a fresh inlet.

6. The method of claim 3 wherein the air/hydrocarbon mixture is directed to the collection media by a transportation system.

7. The method of claim 1 wherein the air/hydrocarbon mixture is directed to the collection media by a transportation system.

8. The method of claim 7 wherein the transportation system comprises at least one duct.

9. The method of claim 1 wherein the air-hydrocarbon mixture is forced through the collection media by a fan.

10. The method of claim 1 wherein the air-hydrocarbon mixture is forced through the collection media by a pump.

11. A filter for the collection and disposal of airborne hydrocarbons in a liquid electrophotographic printer comprising:

a housing having at least an inlet, and a non-leachable oleophilic absorbent contained within said housing.

12. The filter of claim 11 wherein the housing is substantially comprised of a screen-like mesh, the screen-like mesh acting as the inlet.

13. The filter of claim 11 wherein the housing is a three-dimensional cartridge, having at least two opposing (parallel) sides, that is substantially impervious to airborne hydrocarbons.

14. The cartridge of claim 13 wherein one of the opposing sides contains the inlet, and the opposite side contains an outlet.

15. The cartridge of claim 13 wherein the absorbent portion is comprised of a plurality of absorbents layered to best remove airborne hydrocarbons of all sizes.

16. The filter of claim 11 wherein the absorbent portion comprises a particulate oleophilic absorbent that is enclosed within an oleophilic cloth or non-woven material.

17. The filter of claim 11 wherein the absorbent portion is comprised of a plurality of absorbents blended together to meet specific absorbent needs.

18. The filter of claim 11 wherein the absorbent portion is comprised of a plurality of absorbents layered to best remove airborne hydrocarbons of all sizes.

19. The filter of claim 11 further comprising the inclusion of air channels through the absorbent layer.

20. An electrophotographic printing apparatus comprising a source of electrophotographic ink or toner, an electrophotographic printing surface, a source of imaging radiation, and a liquid electrophotographic printer exhaust, the exhaust further comprising a source of air with airborne hydrocarbon droplets as either vapor or mist during the transportation of electrophotographic ink or toner, a flow system for moving substantially all of the air and hydrocarbon droplet mixture to a central collection point, in the central collection point, a substantially non-leaching collection media, and an exhaust for air leaving the central collection point.

* * * * *